G. W. N. YOST.
Corn Planter.
No. 27,764.            Patented Apr. 3, 1860.
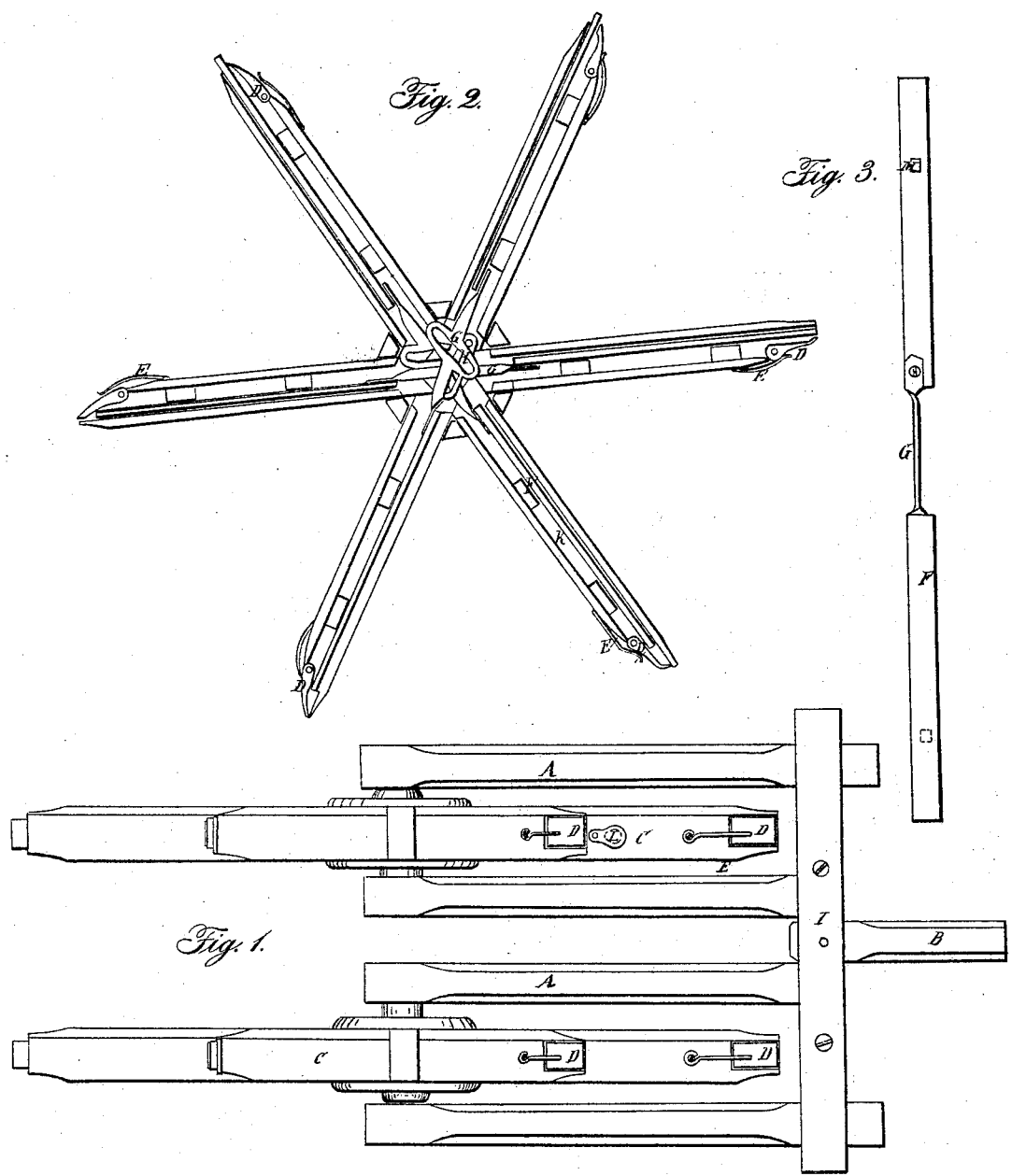
Witnesses:            Inventor:

UNITED STATES PATENT OFFICE.

GEO. W. N. YOST, OF YELLOW SPRINGS, OHIO, ASSIGNOR TO G. W. N. YOST & CO., OF SAME PLACE.

IMPROVEMENT IN CORN-PLANTERS.

Specification forming part of Letters Patent No. 27,764, dated April 3, 1860.

*To all whom it may concern:*

Be it known that I, GEO. W. N. YOST, of Yellow Springs, in the county of Greene and State of Ohio, have invented a new and useful Improvement in Radial Rotary Corn-Planters; and I do hereby declare that the following is a full and exact description thereof, reference being had to the accompanying drawings, and to the letters of reference marked thereon.

My invention consists in an improvement of radial rotary corn-planters for check-row planting.

In the accompanying drawings, Figure 1 is a top view of my corn-planter. Fig. 2 is a side view of one of the series of radial rotary arms, the side pieces of said arms being removed to show the corn-boxes and the arrangement for operating the slides in dropping the corn.

The frame of my machine consists of bars A, Fig. 1, connected by a cross-bar, I, to which the team-shaft B is attached. Each series of radial arms C is connected with the bars A by two separate journals attached to said arms externally, so that the center of the hub may be occupied by cams yet to be described. These two series of radial arms act as traveling wheels, the extremities of the arms bearing upon the ground. The radial arms are made hollow and have seed-boxes K, the grain being introduced through openings L. Passing through these seed-boxes are slides F, (seen best in Fig. 3,) two of the slides being united by a metallic strap, in the center of which is an ogee slot or double cam, G. (Seen best in Fig. 2.) This ogee slot fits upon a crank-pin, H, Fig. 2, so that the rotation of the series of arms C (as the machine moves forward) causes the slides F to move alternately backward and forward in the seed-boxes. In the side of each slide F is a feed-cup of proper size to receive the number of kernels of corn desired to be dropped in a hill. This cup M receives its charge from the seed-box at each stroke of the slide F, and as the slide advances the charge falls from the cup and rolls down to the end of the slide F against the jaw D, which is held by the spring E. When the extremity of the arm C strikes the ground the slide F is driven downward, forcing the corn past the jaw D, as seen in Fig. 2, at the bottom. Thus the corn is deposited in the hole made by the extremity in supporting the weight of the machine.

The operation of my corn-planter is as follows: The extremities of the arms C in the two series are set even, and then the machine is drawn forward across the field, thus planting the hills at uniform distances. On returning care must be taken to start the machine so as to plant the first hill opposite the last hill of the rows already planted.

The construction of corn-planter above described is at once simple, cheap, and convenient. The number of radial arms in a series and also the number of series of radial arms in a machine may be varied at pleasure without departing from my invention.

I claim—

The arrangement of the cams G, slides F, and crank-pin H, in connection with the radial arms C, in the manner and for the purposes substantially as described.

G. W. N. YOST.

Witnesses:
EDM. F. BROWN,
DANIEL BREED.